ง

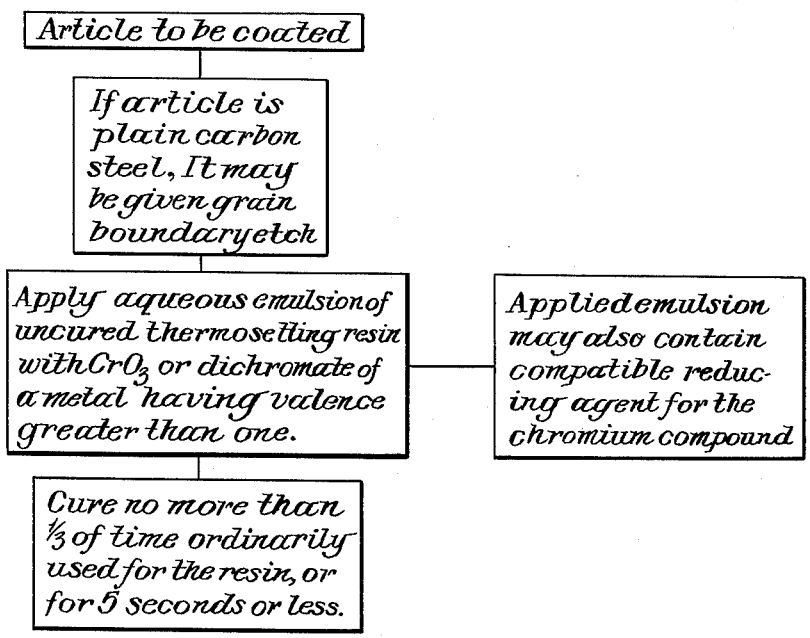

United States Patent Office 3,094,435
Patented June 18, 1963

3,094,435
COATING WITH THERMOSETTING RESIN
Ludwig K. Schuster, Philadelphia, and Alfonso L. Baldi, Drexel Hill, Pa., assignors to Pennsalt Chemicals Corporation, Philadelphia, Pa., a corporation of Pennsylvania
Filed Feb. 9, 1961, Ser. No. 88,018
10 Claims. (Cl. 117—132)

The present invention relates to the coating of metal or similar articles, particularly while these articles are moving.

Corrodible metals are generally manufactured with some sort of production line equipment, and when in sheet or wire form, the usual production line turns out the metal in substantially continuous lengths. Because of the nature of the metal, it is essential that it be protected against corrosion even before the finished product into which it may be fabricated is placed in service. The most economical arrangement for supplying coatings to such metal or to other articles similarly made, is generally while it is formed on the production line since coating in this manner is accomplished with minimum equipment and supervsion. However, where the production line would be rendered too awkward by such an addition, the most practical alternative is generally to have the coating applied to the article after it is coiled up from the production line by running it through a separate coating line as continuously as possible.

Most production and coating equipment of the above type is geared to operate at high speeds, generally with the articles moving at speeds of from about 100 to 700 or more feet per minute. Such speeds will enable adequate supervision and control of the coating operation, but make very efficient use of the equipment so that the net coating cost is held to a minimum.

It is furthermore simpler to treat and handle metal or other articles in the continuous elongated sheet, strip, bar or wire form rather than to apply coatings to the products fabricated from these articles. In addition, with some corrodible metals such as plain carbon steels, corrosion takes place so rapidly that it should receive a protective coating as promptly as possible.

For maximum protection corrodible metals are sometimes covered with at least one layer of a resinous coating such as a paint. Some of the best protective resins are the so-called thermosetting type of resins, that is, those that are applied while in a form that has considerable chemical reactivity, and a final cure or heat treatment is used to convert the applied coating to the finished or so-called cured or hardened form. In general, such heat treatments are carried out for a relatively large number of minutes inasmuch as this order of time seems to be required to effect the desired curing. However, even a one minute curing operation carried out on a production line moving at a speed of 150 feet a minute calls for an exceedingly long curing oven and is accordingly not very practical.

Among the objects of the present invention is the provision of novel processes for applying protective coatings that contain thermosetting resins and novel coating compositions of this type that can be cured in a relatively short period of time.

The above as well as additional objects of the present invention will be more fully understood from the following description of several of its exemplifications, and from the appended drawing in which the sole FIGURE is a flow-sheet of applicants' new processes.

The present invention is characterized by the application to a rapidly moving article of a film of an aqueous dispersion of an uncured thermosetting resin mixed with a chromium compound selected from the class consisting of chromic acid and water-soluble dichromates of metals having a valence higher than one, the ratio of resin-to-chromium compound being from about 5:1 to 1:5 by weight, and then converting the film to a solid cured layer by heating for not more than a small fraction of the standard curing time for the resin.

Examples of uncured thermosetting resins suitable for use in this invention include alkyd resins, particularly those that are modified with drying oil acids and those that are made with tetrafunctional or trifunctional ingredients (e.g. erythritol or glycerol) such as those described in U.S. Patent 2,634,245; thermosetting-type butadiene-styrene resins, as described in U.S. Patent 2,772,254; epoxy resins; ordinary oleoresinous paints, melamine-formaldehyde resins and urea-formaldehyde resins, both unmodified or modified as by butylation.

The following working examples further explain the details of this invention:

Example 1

A line for treating SAE 1010 sheet steel 11 mils thick at the rate of 130 feet per minute, was set up with an uncoiler, an electrolytic cleaner, a tap water rinse, a 1% aqueous $H_2SO_4$ bath, a second tap water rinse, a 3% aqueous nitric acid bath, a third tap water rinse accompanied by a brushing arrangement, a coating station with grooved rubber rolls pressed against the opposite faces of the moving sheet, a flaming oven, and a recoiler with a water-cooled supply roll.

The electrolytic cleaner was a pair of tanks containing an aqueous solution of 3% disodium hydrogen phosphate and 2% sodium carbonate, held at 160° F. Each tank had an electrode held one inch away from both faces of the traveling sheet, the electrode in the first tank being connected to the negative terminal of a source of direct current, and the electrode in the second tank being connected to the positive terminal of this source. A current of 40 amperes per square foot of the treated steel was maintained.

The nitric acid etch was a tank containing a plurality of jet nozzles four inches apart across the width of the sheet and along four feet of its length. Each nozzle had a circular discharge opening ¼ inch in diameter and all were connected to a pump for discharging streams of aqueous 3% $HNO_3$ by weight held at a temperature of 70° F. against the sheet under a pressure of 15 pounds per square inch. The acid streams dropping off the sheet were collected and recirculated with periodic additions of fresh $HNO_3$ to keep up the etching activity, and with periodic removal of the used etching bath, replacing the removed bath by fresh acid as needed.

At the coating station a coating dispersion was sprayed across each face of the sheet in the bight of the roll. The coating dispersion was made with an emulsion of butadiene-styrene copolymer produced in accordance with Example 1 of U.S. Patent 2,683,698 but using styrene in place of the mixed vinyl toluenes, and omitting the sodium bicarbonate. This emulsion was first diluted with water to near its final solids concentration, and acidified with acetic acid to adjust its pH to 4, then mixed with similarly diluted chromic acid predissolved in water in an amount equal to the dry weight of resin, and sucrose in an amount ⅓ that of the chromic acid, the mixture being finally diluted with water to give a solids content of 12%. Excess coating dispersion running down off the sheet was collected and recirculated. The grooved rolls were pressed together to give a final coating (after flaming) weighing 130 milligrams per square foot on each face.

The flaming oven was six feet long with gas burners directing flames over both surfaces of the sheet and controlled to gradually heat up the sheet to a substantially uniform temperature of 375° F. as it emerged.

The coated sheets produced in the above manner showed no tendency to stick together during the recoiling, indicating that the coatings were fully cured in the few seconds that the heating was applied. Outdoor exposure tests showed the coated steel to have exceptionally high corrosion resistance, exceeding that of electrolytic ¼ pound per base box tinplate (0.000015 inch layer of tin).

Similar results are also obtained when proprietary styrene-butadiene resins, such as "Dow Latex 566" are used.

*Example II*

Example I was repeated except that in place of the butadiene-styrene resin there was used an emulsion of the alkyd resin prepared as described in Example 1 of U.S. Patent No. 2,634,245. The ratio of resin to $CrO_3$ was increased to 1.5:1, the sugar reduced to ¼ the $CrO_3$, the total solids content increased to 15% and the pressure on the coating rolls diminished slightly, to cause the finished coating weight to increase to 170 milligrams per square foot on each face of the steel. Again the coated steel showed no tackiness and seemed to be fully cured immediately after coming out of the flaming oven. As compared with the product of Example I, the final product was about equal in bare corrosion resistance when exposed to outdoor environments.

*Example III*

In this case an aluminum sheet 14 mils thick was used in place of steel, the $H_2SO_4$ bath and the etching step were omitted, and the coating was carried out as in Example II, but with a coating weight of 110 milligrams per square foot, a resin to $CrO_3$ ratio of 1:2, and instead of the sugar an amount of triethanolamine corresponding to 40% of the weight of $CrO_3$. Very good weathering resistance is shown by the coated aluminum. Similar good results are obtained if the alkyd resin dispersion is replaced by an emulsion of a linseed oil paint in which the oil had been bodied by heating without blowing at 750° F. for four hours, and containing 2% $TiO_2$ as a pigment.

*Example IV*

The procedure of Example I was here also followed with SAE 2315 steel sheet 9 mils thick, but the $H_2SO_4$ treatment and the etch were omitted, and the coating resin was a mixture of equal weights of (a) an alkyd resin like that of Example II with the tung oil replaced by an equal amount of soy bean oil, and (b) a butylated melamine-formaldehyde resin prepared by heating 5 mols of formaldehyde with one mol of melamine, an excess of butanol and ½% of phosphoric acid, the heating being continued to cause the water of reaction to be distilled off, and the viscosity at 25° C. reaches a viscosity grade of R in the Gardner-Holdt test. The ratio of coating ingredients was kept the same except for the sugar which was reduced to ⅕ the weight of the $CrO_3$.

It is preferred with plain carbon steels to give the steel surface a grain-boundary etch before applying the resin-chromium compound coating, and to also use sucrose as the reducing agent for the chromium compound. The desired etch is obtained using $HNO_3$, picric acid or ammonium persulfate as etchant. Ferric nitrate behaves like $HNO_3$, and seems to give rise to free $HNO_3$ when it is dissolved in water. A removal of at least about 50 milligrams per square foot should be effected by the etching in order to obtain significant advantages, and the advantages increase up to a removal of about 400 milligrams per square foot. Beyond this there is no significant improvement, and for some purposes more severely etched coated metal even seems to lose some of its corrosion resistance.

Plain carbon steels are those that contain no more than about 2% of alloying metals. They can have a carbon content varying from extremely low values, 0.05% or even less, to as much as 1.4% or higher. The phosphorus and sulphur contents can range from substantially zero up to several tenths of a percent. Generally phosphorus maxima are about 0.15% and sulphur maxima about 0.3%. These materials include the steels ordinarily considered as carbon steels (SAE 1010 to 1095), free cutting steels, plain carbon tool steels, including those that have up to several percent of silicon, and casting metals.

With other steels or metals of different kinds such as copper, brass, aluminum, zinc, tin and magnesium, grain-boundary etching is not of much significance and since it is relatively costly, is better omitted. When aluminum is to be coated in accordance with the present invention, it is desirably roughened as by etching beforehand with aqueous caustic soda containing sodium gluconate, or by sand blasting or other techniques.

Zinc dichromate, magnesium dichromate, calcium dichromate and nickel dichromate, as well as other water-soluble dichromates of metals having a valence of 2 or greater, behave with the same cure acceleration effectiveness as the $CrO_3$. The dichromates are additionally desirable in that they form coating mixtures which are more stable than the corresponding mixtures in which $CrO_3$ is the chromium compound. The resin dispersions generally contain organic dispersing agents that are much more readily attacked by $CrO_3$ than by a dichromate. Dichromate mixtures free of $CrO_3$ give the most dramatic improvement in stability. The following is an example of such a coating process:

*Example V*

A coating mixture is prepared so as to contain:

218 grams of the thermosetting butadiene-styrene resin available as "Dow Latex 566" dispersed in an amount of water that brings the volume up to 625 cc.

3 grams Triton 102 (a commercial alkyl-phenyl polyethoxy ethanol wetting agent), 3 grams sucrose, 38 grams of an aqueous dispersion of $TiO_2$ pigment containing 36% $TiO_2$ by weight and also containing 3% cellosize (hydroxyethyl cellulose), 111 grams of an aqueous dispersion of phthalocyanine blue pigment containing 25% of the pigment and stabilized with 1% Triton 102, and 64 grams zinc dichromate.

The resulting dispersion will keep for a few days, and is readily applied to SAE 1020 steel sheets with a conventional spray gun and cured with a ten second dwell in an air oven kept at 1000° F. The coated metal is extremely resistant to corrosion and the coating is also unusually ductile, withstanding conventional forming operations. The chromium conversion to trivalent condition amounts to about 70%.

The same coating mixture without the $TiO_2$ dispersion but diluted with 7 times its volume of water also acts as a good dipping bath for coating metal wire such as low carbon steel, spring steel, galvanized steel and aluminum, to give cured coatings weighing somewhat over 200 milligrams per square foot.

The sugar of Examples I, II and III can be replaced by an equivalent amount of other material which will act as a reducing agent for the chromic acid. Examples of such other reducing agents are listed in U.S. Patent 2,777,785, but that listing is not exhaustive. Other suitable reducing agents include aluminum lactate and the salts of lactic acid with metals other than alkali metals, calcium maleate, and other water-soluble metal salts of organic acids that are readily oxidizable to volatile and insoluble products. These reducing agents can be used with the resin-containing or resin-free coating mixture. As also explained in that patent, the preferred reducing agents are those that do not contribute to the final coating any significant amount of water-soluble materials. The amount of reducing agent can be varied to produce a final coating in which the hexavalent chromium has been reduced to trivalent form in a proportion of from as high as 95% to as low as 40% or even lower. The minimum of 40% reduction applies to coatings in which the resin-to-chromic acid content is less than 1:2 parts by weight. As the resin proportion is increased above this minimum, the proportion of reducing agent can be diminished or the reducing agent can be entirely eliminated.

In the range of resin-to-chromic acid proportions of from 3:1 to 1:2 by weight, the above chromic acid or dichromates, with or without the reducing agent, acts to cause curing of the resin to take place essentially instantaneously as soon as the coating reaches the appropriate curing temperature, generally about 225 to 450° F. However, the curing at temperatures below 275° F. may not go to the desired degree of completion and heating of the coating to about 450° F. or higher for more than about 15 seconds will deleteriously affect the quality of the coating. Curing temperatures as high as 600° F. or even 650° F. can be used with very good results where this temperature is maintained for less than about 5 seconds. Although the curing is extremely rapid once the desired curing temperature is reached, the reaching of that temperature generally takes some time, depending upon the source of heat, the size and shape of the object being heated, etc. Sheet metal can generally be brought to any desired temperature up to and including 450° F. in from one to four seconds, even if the metal is moving in a production line at speeds of from 100 to 700 feet per minute or higher.

The effect of the chromic acid or dichromates in shortening the curing time begins to drop off when the resin-to-chromic acid ratio increases beyond 3:1 in parts by weight. However, even at a ratio of 5:1 the curing time required is still less than five seconds even with those thermosetting resins which are recommended by their manufacturers for curing over a period of fifteen mintues or more.

In accordance with the present invention the resin is rendered fully curable in a small fraction of the normal time required for curing in the absence of chromic acid. The reduction is generally to not over ⅓ the standard curing time and as pointed out, in some cases as with resins that are normally cured within fifteen minutes in the absence of chromium compound, the shortening is down to as little as about 1/500 of the normal curing time.

As soon as the metal emerges from the curing oven, it begins to cool down rapidly, particularly if it is in thin sheet form. Since it is generally undesirable to coil up sheet metal when it is at a temperature above about 175° F., the metal can be permitted to cool for the necessary period of time. Where the higher curing temperatures are used, spontaneous cooling may be too protracted and it is then helpful to speed up the cooling by applying water, either hot, warm or cold; by contacting the metal with one or more water-cooled rolls; or by blowing air over the metal. Combinations of the above cooling techniques can also be used. The contacting of the hot coating with water to cool the metal down does not have any deleterious effect even if the water is very cold and the metal at a temperature of 450° F. In fact, such a liquid quench seems to improve somewhat the corrosion resistant characteristics of the final coated product.

The high speed curing step of the present process can also be used with thermoplastic resins. For example, a 200 milligram per square foot methacrylate resin-chromic acid coating on aluminum will be completely dried in about two seconds at 350° F. where the resin-to-chromic acid dry weight ratio is 1:1 and the sugar is present in an amount ⅓ the weight of the chromic acid.

Low carbon steel coated in accordance with the present invention is particularly suited for can making purposes. In alkaline environments, as when used as containers for detergents and other products, it performs better than tin plate, even when the tin plate is covered with an enamel.

In most cases where used as a can, the metal can wall is subjected to different conditions on the outside as compared with the inside. It is therefore desirable in such cases to coat the different faces of the metal in different ways. Accordingly, the resin can be omitted from the coating on the outer surface of the can wall where the cans are not exposed to severe corrosion conditions, or where it is so exposed and its external surface is to be given a lithographic enamel or other painted coating for the purpose of acting as a label or as a decoration, etc.

Conversely, where the internal surface of the can is exposed to less corrosive conditions, such as one that is used as a container for dry foods or the like, the internal surface can have the resin omitted from the coating of the present invention while the external can surface has the resin-chromium oxide coating. If desired, the resin-free coating on the internal surface of such a can can be covered by the usual sanitary enamel or other paint.

The resin-chromium oxide coating being more resistant to acids and neutral detergents than the resin-free chromium oxide coating, the resin-containing coating can be used without a top coat of enamel when packing these materials. Oil-in-water emulsion paints having an acidic nature are also desirably packed in the resin-chromium oxide coated containers.

Dissimilar coatings on the opposite faces are conveniently prepared by separately applying the appropriate dispersions to these faces of the original metal sheet, by means of transfer rolls. In other words, adjacent each face there can be a separate pair of rolls with different dispersions poured into the bight of the rolls on each side. One of each pair of rolls is also arranged to contact the metal surface. By adjusting the spacing and/or compression between each pair of rollers, the amount of coating dispersion carried through the bight is controlled and a uniform layer of the resulting film of coating dispersion is transferred to the metal surface. The rolls should be arranged to rotate and be fed with coating dispersion in such a manner that the transfer roll does not contact the metal surface until after it has received the dispersion and after the dispersion is passed through the bight. Identical or different coatings can be applied to the opposite faces of sheets while the width of the sheet is disposed either horizontally, vertically, or in any angle in between. With different coatings on the opposite faces, any run-off from the bights of the roll pairs should be kept from mixing and can be separately recirculated. With the sheet held at any desired angle, the path of movement of the sheet can be also selected from anything ranging from horizontal to vertical or at any intermediate angle.

The cleaning step assures that the coating is applied directly to the metal rather than on any other material that might be on its surface. Any suitable cleaner, either non-electrolytic or electrolytic, can be used, and where the metal surface is not contaminated, as in a metal-producing line in which the metal is freshly formed and not precoated, no cleaning is necessary. Even in metal-producing lines, however, the fresh metal may be oiled and such will have to be removed if the aqueous coating dispersions of the present invention are to uniformly wet the metal. Better wetting can be obtained by incorporating in the coating formulation a quantity of wetting agent or of organic solvents such as tertiary butyl alcohol, acetone or similar materials that are driven off during the curing step yet tend to reduce "water-breaks" when the metal surface is not perfectly clean. Where a wetting agent is used it can be anionic, cationic or non-ionic, and is preferably one that is compatible with the resin dispersion. In most cases the dispersion itself is made with a wetting agent and no further wetting agent is needed. As a matter of fact, large amounts of wetting agents are not desired since they tend to remain in the final cured coating and detract from its protective value. A maximum wetting agent content of 1% based on the total resin and chromic acid weight is a good practical limit.

Some metals like aluminum and zinc are very readily attacked by anodic treatment in cleaning baths, and if no etch is desired, are better cleaned non-electrolytically or in electrolytic cleaners in which the work is subjected to cathodic electrolytic currents only. Vapor degreasing is also effective and can be used in place of or in combination with alkaline cleaning.

The 1% aqueous $H_2SO_4$ treatment is useful as a preparatory step for the grain-boundary etch. As explained in U.S. Patent 2,777,785, granted January 15, 1957, this preparatory treatment need not effect any measurable etching but even without such effect it prevents the passivation of ferrous metal by the grain-boundary etchant. As shown in this patent, other passivation-prevention treatments can be used in place of the $H_2SO_4$ dip.

The coating rolls need not be grooved and need not even be made of rubber or other resilient material, particularly for the application of heavy coatings. Where grooves are used they can be of any desired depth and can range in width up to as much as 50 mils or more. In some cases, as with some butadiene-styrene resins, there is a tendency for resin particles to deposit on all solid surfaces with which the dispersion comes in contact, and particularly on applicator rolls. Since such deposits can very readily build up to the point where the roll application is non-uniform, it is desirable in these cases to equip the rolls with cleaning devices such as a wire brush that is pressed against the surface sufficiently to reach into the grooves and is traversed across the roll width either continuously or intermittently, as needed.

Other resins such as alkyd resin emulsions do not seem to show this tendency to deposit out, nor do they, in most cases, require prior filtration to remove large size particles.

The specific nature of the action of the chromic acid in shortening the curing time of the resin is not understood. It has been noted in this connection that the alkyd resin of Example II, when separately applied and similarly flamed over a previously cured coating deposited from an aqueous solution of chromic acid and reducing agent only, remains tacky.

The polyvalent metal dichromates of the present invention undergo conversion to trivalent chromium compounds, and effect cure-shortening as though the dichromates were mixtures of chromic acid with the oxide of the polyvalent metal. It is generally desirable to consider the $CrO_3$ content of the dichromates as the active ingredient in calculating formulation ratios. Inasmuch as each dichromate ion behaves like two molecules of $CrO_3$, the remainder of the dichromate is so small a proportion that it can be ignored in most instances.

The protective nature of the above coatings, whether or not containing resin, is also of value in extending the life of scalpels, razor blades, and the like. By way of illustration, a scalpel made of plain carbon razor steel when carrying a resin-free cured coating deposited from a solution of 1% chromic acid and ⅓% sugar, can be used for as many as five separate operations before it need be discarded. A similar razor blade also has a two- to four-fold increase in life when used for normal shaving. Such results are also obtained when the coating is deposited from a solution that, in addition to the chromic acid, contains resin in the proportions of the present invention, and the resins can be either thermoplastic or thermosetting. It appears that the life of a razor edge is determined to a large extent by corrosion, particularly where the edge is only used during widely spaced intervals of time.

Aluminum-surfaced and stainless steel building panels, storm windows, etc., that are exposed to weather are also very desirably coated in the above manner. The coatings greatly reduce pitting and corrosion whether or not the resin is included with the chromic acid or dichromate, and whether the resin is thermoplastic or thermosetting. Especially effective weather resistance is obtained when such coatings are applied over aluminum that has been slightly or heavily anodized.

The coatings of the present invention can also be applied to paper, cardboard, wood, or any other material. When applied to these materials, the resin can either be incorporated or omitted from the coating film, depending upon the type of coating desired. Although the presence of the resin in the coating gives a better appearing finish to these cellulosic articles, without the resin the coating contributes fireproofing and also improves the cementing of these articles to metal and plastics, for example. In curing the coatings of the present invention when they are applied to materials, such as paper, that char readily, it is desirable to keep from exposing these materials to direct flaming or other high temperature contacts. Infrared radiation can be used for this purpose.

The resin-containing coatings also have an advantage over the resin-free coatings in that they are more suitable for application by a spraying operation. This appears to be attributable to the fact that the resin-containing coating is in the form of a dispersion rather than a true solution. However, spraying of the resin-free chromium oxide reducing agent solutions on a hot metal surface (150–200° F.) gives a coating film very uniform in thickness and appearance.

The chromium oxides in the final resin-containing coatings where the reduction is over 70%, do not impart any appreciable pigmentation, and these coatings, even in weights of 250 milligrams per square foot, look somewhat pale and milky. The addition of standard pigments will color these coatings any desired hue. Coating weights can go to 2500 milligrams per square foot and higher to further increase corrosion protection. Coating weights less than 100 milligrams per square foot are preferably used with additional coatings, or on materials such as stainless steel, that are not too quick to corrode. Where the degree of hexavalent chromium reduction is less than 70%, as when the proportion of reducing agent is diminished, or it is completely eliminated, the coatings tend to be brown or red colored with a relatively high color intensity. Conversions of 70% or even lower give coatings as in Example V that have better ductility. Resin-to-chromium compound ratios of 2:1 or higher also give better ductility.

The degree of conversion can be increased by subjecting the cured coating to a wash with hot water (above 160° F.). A one-half minute wash will change a 20% converted coating to a 40% converted one, apparently by removing some of the unconverted hexavalent chromium compound.

The chromium oxide coatings, whether or not they contain resin, impart such unusual resistance to attack by alkaline media, that they are very effectively applied to the anodized surfaces of aluminum, where these surfaces are subject to exposure to alkaline agents. Anodized aluminum automobile trim or parts when coated in this way, are much more resistant to pitting or other corrosion under the influence of repeated soapings. Where the anodized surfaces have been colored as by dyes or the like, these colors are not appreciably altered by thin chromium oxide coatings whether or not resins are included.

This application is in part a continuation of applications Serial No. 666,852, filed June 20, 1957; Serial No. 708,772, filed January 14, 1958 (now abandoned); Serial No. 738,648, filed May 29, 1958, now U.S. Patent 3,053,-693, granted September 11, 1962; Serial No. 814,200, filed May 19, 1959, now U.S. Patent 3,053,702, granted September 11, 1962; and Serial No. 6,021, filed February 1, 1960.

Obviously many modifications and variations of the present invention are possible in the light of the above teachings. It is, therefore, to be understood that within the scope of the appended claims the invention may be practiced otherwise than as specifically described.

What is claimed:

1. In the process of coating an article with a film of thermosetting resin that has a definite curing time requirement, the improvement by which the resin is applied as an aqueous emulsion in which it is mixed with a chromium compound selected from the class consisting of chromic acid and water-soluble dichromates of metals having a valence greater than one, the mixture having a resin-to-chromium compound ratio of from about 5:1 to 1:5 by weight, and the curing is terminated in not more than about five seconds.

2. The combination of claim 1 in which the aqueous emulsion also contains a reducing agent for the chromium of the chromium compound, the reducing agent being compatible with the chromium compound under the application conditions and the amount of reducing agent being not more than sufficient to reduce the chromium of the chromium compound to trivalent chromium during the curing step.

3. The process of coating an article while it is moving rapidly, said process being characterized by the application to the article of a film of an aqueous emulsion of an uncured thermosetting resin mixed with a chromium compound selected from the class consisting of chromic acid and water-soluble dichromates of metals having a valence greater than one, the ratio of resin to chromium compound being from about 5:1 to 1:5 by weight, and then converting the film to a solid cured layer by heating for not more than about five seconds to a temperature no higher than about 450° F.

4. The process of claim 3 in which the article coated is a metal and the resin is selected from the class consisting of drying-oil-modified alkyd and thermosetting butadiene-styrene.

5. The process of claim 4 in which the metal being coated is plain carbon steel and the surface of the metal has a grain-boundary etch.

6. The process of coating sheet metal while the metal is moving at a speed of at least about 100 feet per minute, said process being characterized by the application to the metal of a film of an aqueous emulsion of an uncured thermosetting resin mixed with a chromium compound selected from the class consisting of chromic acid and water-soluble dichromates of metals having a valence greater than one, the ratio of resin-to-chromium compound being from about 3:1 to 1:2 by weight, and then converting the film to a solid cured layer by heating the filmed metal for from about 1 to 3 seconds to bring its surface to a temperature of from 275 to 450° F., the amount of film being controlled to provide a final coating weighing from 100 to 2500 milligrams per square foot.

7. In the process of coating an article with a film of thermosetting resin that has a definite curing time requirement the improvement by which the resin is applied as an aqueous emulsion in which it is mixed with zinc dichromoate and with a reducing agent compatible with the zinc dichromate under the application conditions, the ratio of resin-to-chromic acid being from about 5:1 to 1:5 by weight, and the applied emulsion is fully cured in not more than about one-third of said time requirement and the amount of reducing agent being not more than sufficient to reduce 95% of the chromium in the zinc dichromate to trivalent condition during the curing step.

8. In the process of coating an article with a film of thermosetting resin that has a definite curing time requirement, the improvement by which the resin is applied as an aqueous emulsion in which it is mixed with calcium dichromate and with a reducing agent compatible with the calcium dichromate under the application conditions, the ratio of resin-to-calcium dichromate being from about 5:1 to 1:5 by weight, and the applied emulsion is fully cured in not more than about one-third of said time requirement and the amount of reducing agent being not more than sufficient to reduce 95% of the chromium in the calcium dichromate to trivalent condition during the curing step.

9. In the process of coating an article with a film of thermosetting resin that has a definite curing time requirement, the improvement by which the resin is applied as an aqueous emulsion in which it is mixed with magnesium dichromate and with a reducing agent compatible with the magnesium dichromate under the application conditions, the ratio of resin-to-magnesium dichromate being from about 5:1 to 1:5 by weight, and the applied emulsion is fully cured in not more than about one-third of said time requirement and the amount of reducing agent being not more than sufficient to reduce 95% of the chromium in the magnesium dichromate to trivalent condition during the curing step.

10. In the process of coating an article with a film of thermosetting resin that has a definite curing time requirement, the improvement by which the resin is applied as an aqueous emulsion in which it is mixed with nickel dichromate and with a reducing agent compatible with the nickel dichromate under the application conditions, the ratio of resin-to-nickel dichromate being from about 5:1 to 1:5 by weight, and the applied emulsion is fully cured in not more than about one-third of said time requirement and the amount of reducing agent being not more than sufficient to reduce 95% of the chromium in the nickel dichromate to trivalent condition during the curing step.

References Cited in the file of this patent

UNITED STATES PATENTS

| | | |
|---|---|---|
| 1,811,040 | Cox | June 23, 1931 |
| 2,296,070 | Thompson et al. | Sept. 15, 1942 |
| 2,424,730 | Balassa | July 29, 1947 |
| 2,562,119 | Haon | July 24, 1951 |
| 2,709,664 | Evans | May 31, 1955 |
| 2,768,104 | Schuster et al. | Oct. 23, 1956 |
| 2,861,906 | Schuster et al. | Nov. 25, 1958 |
| 2,902,390 | Bell | Sept. 1, 1959 |
| 3,036,934 | Horton et al. | Mar. 29, 1962 |

OTHER REFERENCES

Preuss: Metal Finishing, vol. 59, No. 5, May 1961, pages 56–59, 65.